United States Patent
Passman et al.

(10) Patent No.: US 6,671,819 B1
(45) Date of Patent: Dec. 30, 2003

(54) SYSTEM AND METHODS ROUTING PACKETS ON ALTERATE PATHS

(75) Inventors: William S. Passman, Lexington, MA (US); John R. Zavgren, Acton, MA (US); Susan L. Wood, Wolcott, VT (US); Keith W. Manning, Arlington, MA (US); Joseph J. Weinstein, Somerville, MA (US)

(73) Assignee: BBNT Solutions LLC, Cambridge, MA (US)

( * ) Notice: Subject to any disclaimer, the term of this patent is extended or adjusted under 35 U.S.C. 154(b) by 0 days.

(21) Appl. No.: 09/544,824

(22) Filed: Apr. 6, 2000

(51) Int. Cl.[7] ............................................. H04L 12/56
(52) U.S. Cl. .......................................... 714/4; 370/400
(58) Field of Search ................................ 714/4; 370/400

(56) References Cited

U.S. PATENT DOCUMENTS

| | | | |
|---|---|---|---|
| 4,679,189 A | | 7/1987 | Olson et al. ............... 370/60 |
| 5,115,495 A | * | 5/1992 | Tsuchiya et al. ........... 709/239 |
| 5,142,531 A | | 8/1992 | Kirby ....................... 370/94.3 |
| 5,173,689 A | * | 12/1992 | Kusano ..................... 370/225 |
| 5,218,601 A | * | 6/1993 | Chujo et al. ............... 370/228 |
| 5,235,599 A | * | 8/1993 | Nishimura et al. ........... 714/4 |
| 5,452,294 A | | 9/1995 | Natarajan ................... 370/54 |
| 5,455,865 A | * | 10/1995 | Perlman .................... 713/153 |
| 5,513,345 A | * | 4/1996 | Sato et al. .................. 714/4 |
| 5,548,639 A | * | 8/1996 | Ogura et al. .......... 379/221.04 |
| 5,590,118 A | * | 12/1996 | Nederlof ................... 370/218 |
| 5,615,254 A | | 3/1997 | Qiu et al. ................... 379/221 |
| 5,646,936 A | * | 7/1997 | Shah et al. ................. 370/228 |
| 5,649,108 A | * | 7/1997 | Spiegel et al. ............. 709/241 |
| 5,732,072 A | | 3/1998 | Thanner et al. ............. 370/255 |
| 5,754,543 A | | 5/1998 | Seid .......................... 370/351 |
| 5,805,818 A | * | 9/1998 | Perlman et al. ............. 709/224 |
| 5,940,372 A | * | 8/1999 | Bertin et al. ................ 370/238 |
| 5,953,312 A | * | 9/1999 | Crawley et al. ............. 370/218 |
| 6,111,673 A | * | 8/2000 | Chang et al. ................ 398/79 |
| 6,141,319 A | * | 10/2000 | Dighe et al. ................ 370/218 |
| 6,157,621 A | | 12/2000 | Brown et al. ............... 370/310 |
| 6,215,765 B1 | * | 4/2001 | McAllister et al. ......... 370/217 |
| 6,282,170 B1 | * | 8/2001 | Bentall et al. .............. 370/225 |
| 6,347,078 B1 | * | 2/2002 | Narvaez-Guarnieri et al. ... 370/230 |
| 6,430,150 B1 | * | 8/2002 | Azuma et al. .............. 370/218 |
| 6,473,405 B2 | * | 10/2002 | Ricciulli ..................... 370/238 |
| 6,519,062 B1 | * | 2/2003 | Yoo ........................... 398/49 |
| 6,530,032 B1 | * | 3/2003 | Shew et al. .................... 714/4 |
| 6,556,577 B2 | * | 4/2003 | Hjalmtysson et al. ....... 370/410 |
| 6,580,715 B1 | * | 6/2003 | Bare .......................... 370/396 |

* cited by examiner

*Primary Examiner*—Stephen M. Baker
(74) *Attorney, Agent, or Firm*—Leonard Charles Suchyta; James K. Weixel

(57) ABSTRACT

A network for routing packets includes multiple nodes. A first node has a direct link to a second node. The first node receives a packet and identifies a primary next hop to which to transmit the packet (410). The primary next hop identifies at least the second node. The first node transmits the packet to the second node (420), determines whether the transmission was successful (430), and identifies at least a third node when the transmission to the second node was unsuccessful. The first node identifies the third node by: finding a node in the network that has a direct link to both the first and second nodes (440); identifying at least one alternate next hop, assuming that the link between the first and second nodes is unavailable, determining the cost associated with each of the alternate next hops, and selecting one of the alternate next hops based on the determined cost (640); or retrieving a predetermined alternate next hop from a forwarding table stored by the first node (940). The first node then transmits the packet to the third node for forwarding to the second node (450, 460).

51 Claims, 11 Drawing Sheets

| DESTINATION NODE | NEXT HOP |
|---|---|
| 120 | 120 |
| 130 | 130 |
| 140 | 140 |
| 150 | 140 |
| 160 | 140 |
| 170 | 140 |

FIG. 3

SYSTEM AND METHODS ROUTING PACKETS ON ALTERATE PATHS

BACKGROUND OF THE INVENTION

A. Field of the Invention

The present invention relates generally to routing systems and, more particularly, to systems and methods for routing packets through a network on alternate paths.

B. Description of Related Art

Currently, several types of communication systems exist, including wireless, wired, optical, and hybrid wireless/wired/optical communication systems. Often times, these systems include a network of interconnected nodes. Each node connects to neighboring nodes via a link. The link may be a wireless, wired, or optical communication channel, depending on the type of system in which it is used.

Communication through these systems involves transmitting a packet of data from a source node to a destination node. Often times, a path from the source node to the destination node is predetermined so that each node can determine how to route a received packet. Sometimes, however, the path is established on-the-fly based on cost factors, such as shortest path, signal strength, connection speed, etc. In these cases, the nodes route a packet to minimize the cost of sending the packet from the source node to the destination node.

If a packet transmitted by a node is not successfully received by the next node in one of these systems, the transmission will fail. The source node usually learns of the transmission failure after a timer expires (i.e., after a timeout). In this case, the source node must try to resend the packet, possibly on a different path.

As a result, a need exists to improve the transmission of packets through a network by using alternate paths to minimize the effects of transmission failures between nodes.

SUMMARY OF THE INVENTION

Systems and methods consistent with the present invention address this need by determining, at each node, the next best path on which to transmit a packet when transmission on a first path fails.

In accordance with the purpose of the invention as embodied and broadly described herein, a network for routing packets includes multiple nodes. A first node has a direct link to a second node. The first node receives a packet and identifies a primary next hop to which to transmit the packet. The primary next hop identifies at least the second node. The first node transmits the packet to the second node, determines whether the transmission was successful, and identifies at least a third node when the transmission to the second node was unsuccessful.

The first node identifies the third node by: finding a node in the network that has a direct link to both the first and second nodes; identifying at least one alternate next hop, assuming that the link between the first and second nodes is unavailable, determining the cost associated with each of the alternate next hops, and selecting one of the alternate next hops based on the determined cost; or retrieving a predetermined alternate next hop from a forwarding table stored by the first node. The first node then transmits the packet to the third node for forwarding to the second node.

In another implementation consistent with the present invention, a method prevents lost or looping packets in a network. The method includes receiving a packet at a first node; transmitting the packet to a second node on a primary path; determining whether the transmission was successful; identifying a third node on an alternate path when the transmission to the second node was unsuccessful; adding a header to the packet, the header identifying at least an address of the second node; transmitting the packet to the third node; analyzing the packet by the third node to identify the address of the second node from the header; sending the packet to the second node using the identified address; receiving the packet at the second node; and clearing the header by the second node.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 3 is an exemplary diagram of a forwarding table in a node of FIG. 1;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention improve packet transmission through a network by determining, at each node on a packet-by-packet basis, a next best path on which to transmit a packet when the first transmission of the packet fails.

EXEMPLARY SYSTEM

Figure 1:
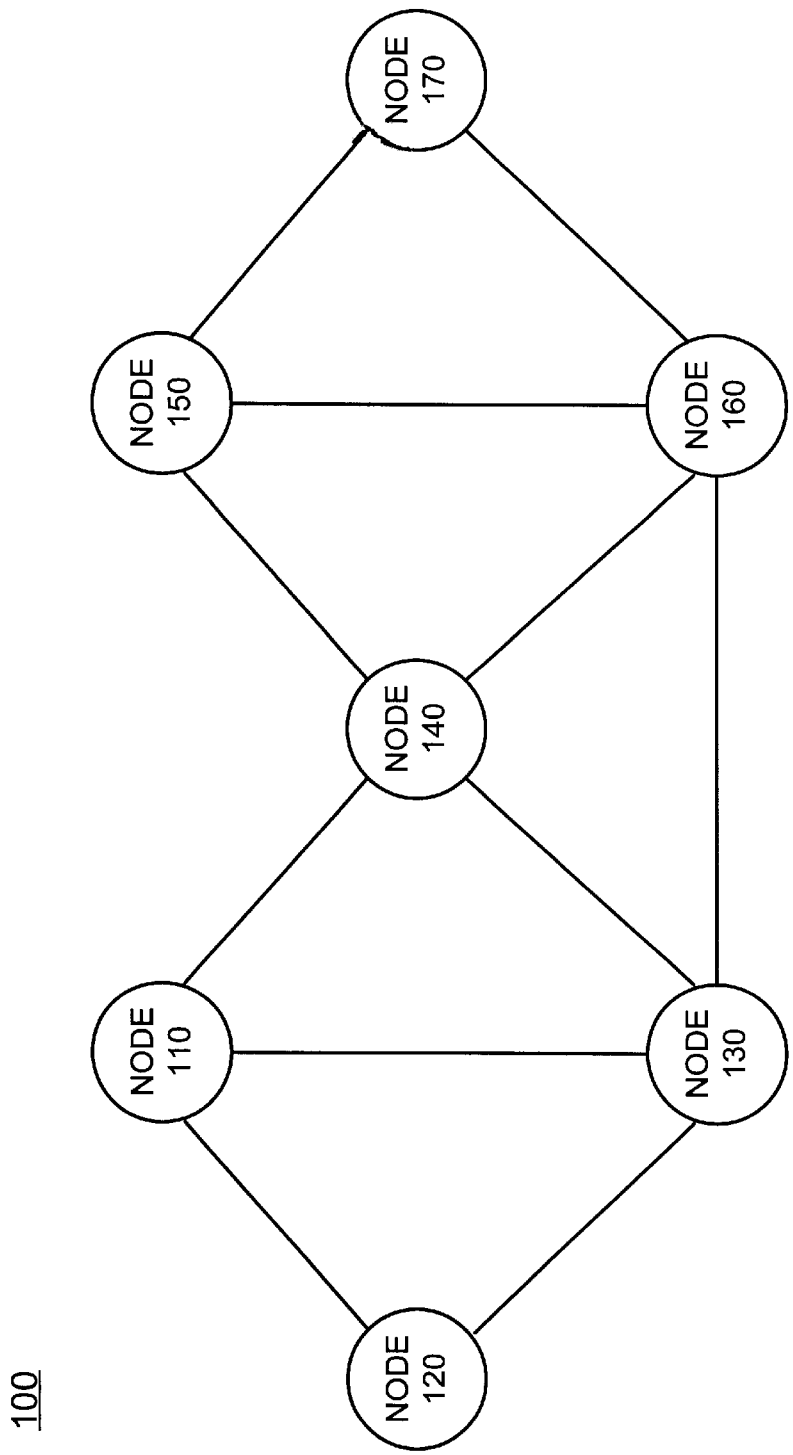
FIG. 1 is a diagram of an exemplary network consistent with the present invention.

FIG. 1 is a diagram of an exemplary network 100 consistent with the present invention. The network 100 may include a packet routing network, such as a mobile wireless network, with several interconnected nodes 110–170. Seven nodes have been shown for simplicity. Each of the nodes connects to neighboring nodes via communication links, such as wired, wireless, or optical links, for the transmission of packets. For example, node 130 connects to neighboring nodes 110, 120, 140, and 160. Other network configurations are also possible. The nodes may also connect to external devices and systems (not shown).

Figure 2:
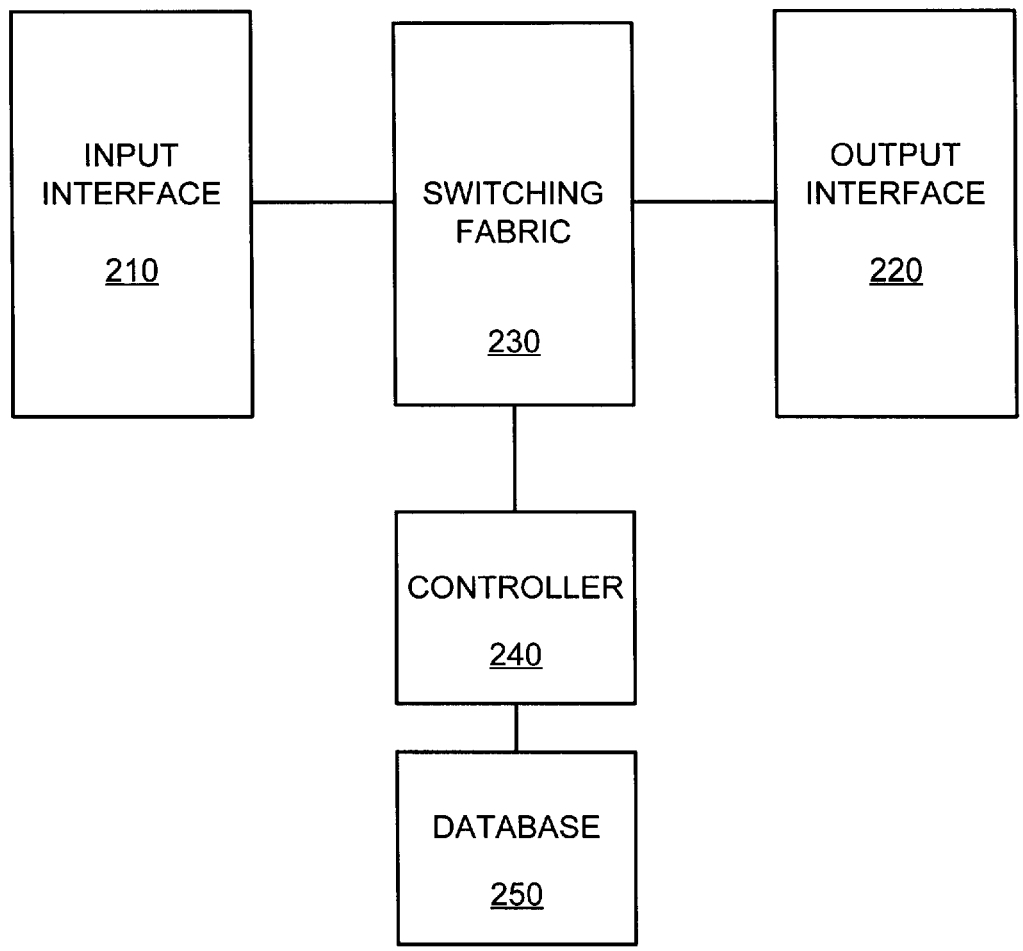
FIG. 2 is a detailed diagram of an exemplary node in the network of FIG. 1.

FIG. 2 is an exemplary diagram of a node 110 consistent with the present invention. Node 110 includes an input interface 210, an output interface 220, a switching fabric 230, a controller 240, and a database 250. The input interface 210 may include multiple input ports and buffers that receive and temporarily store packets from neighboring nodes or external devices or systems. The output interface 220 may include multiple output ports and buffers that temporarily store and transmit packets to neighboring nodes or destination devices or systems. The switching fabric 230 may include a conventional switching fabric to transmit a packet from an input buffer of the input interface 210 to an output buffer of the output interface 220.

The controller 240 controls the operation of node 110. The controller 240 may include a processor, microprocessor, digital signal processor, etc. that analyzes incoming packets, possibly against information stored in the database 250, to configure the switching fabric 230 for sending the packets to the appropriate output buffers within the output interface 220. The database 250 may include a conventional storage device, such as a random access memory (RAM), a magnetic or optical recording medium and its corresponding drive, etc. The database 250 may store information regarding the network 100, such as the network topology, and one or more forwarding tables for routing packets to neighboring nodes.

FIG. 3 is an exemplary diagram of a forwarding table 300 consistent with the present invention. The table 300 includes multiple entries 310 corresponding to possible destination nodes in the network 100. Each of the entries 310 identifies a primary next hop 320 on the path to the corresponding destination node 330. When a node receives a packet, it checks its forwarding table 300 to locate an entry 310 that has a destination node identifier equal to the destination of the packet. This entry 310 identifies the next node on the primary path to which to forward the packet.

EXEMPLARY SYSTEM PROCESSING—FIRST IMPLEMENTATION

Figure 4:
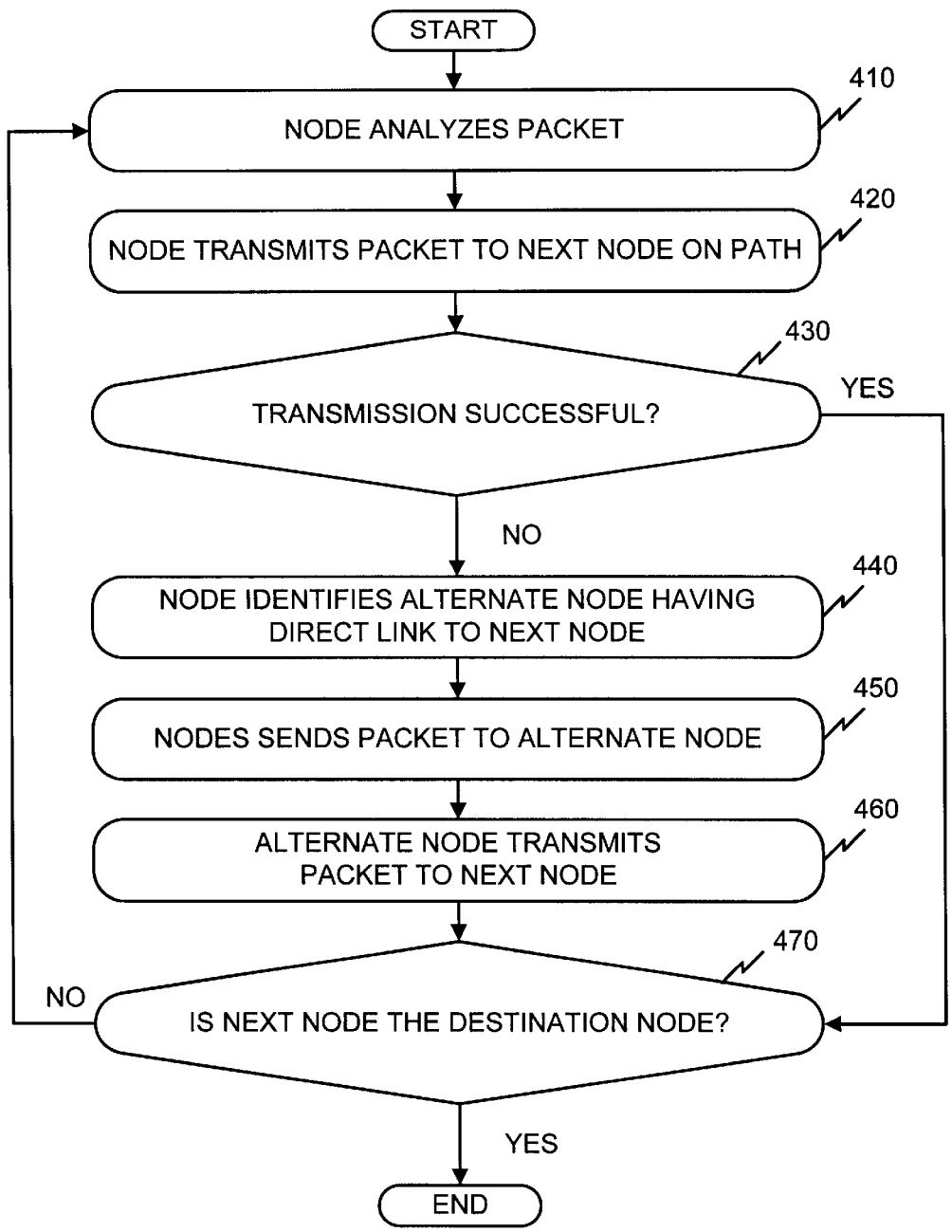
FIG. 4 is a flowchart of processing for routing a packet in accordance with a first implementation consistent with the present invention.
Figure 5A:
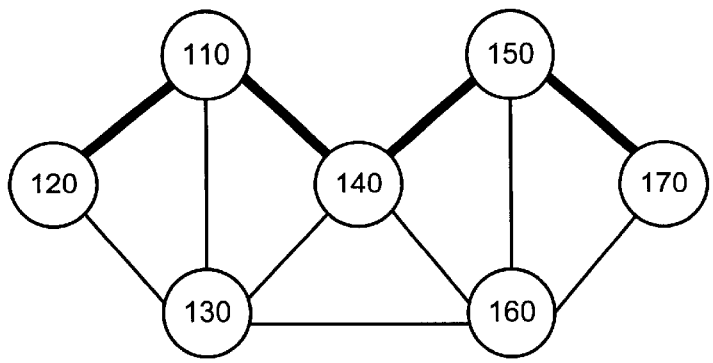
FIGS. 5A–5C are exemplary diagrams of packet routing according to the first implementation consistent with the present invention.
Figure 5B:
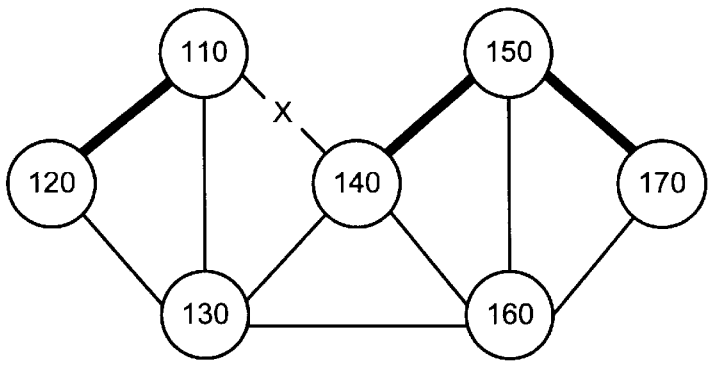
Figure 5C:
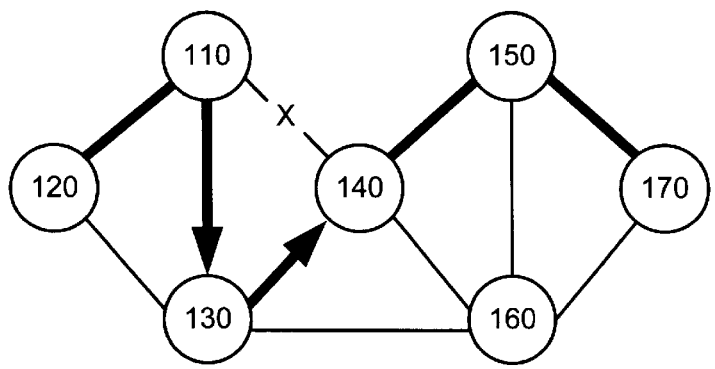

FIG. 4 is a flowchart of processing for routing a packet in accordance with a first implementation consistent with the present invention. FIGS. 5A–5C are exemplary diagrams of packet routing in accordance with the first implementation consistent with the present invention. Processing begins when a source device or system transmits a packet to the network 100. A node, such as node 120, receives the packet. Node 120 analyzes the packet [step 410] and determines that it is destined for node 170, for example. Node 120 then checks its forwarding table and determines that the next node on the primary path to node 170 includes, for example, node 110 (FIG. 5A).

As a result, node 120 transmits the packet to node 110 as the next node on the path [step 420]. If the transmission was successful [step 430] and node 110 is not the destination node [step 470], then processing returns to step 410, where node 110 analyzes the received packet [step 410] and determines that it is destined for node 170. Node 110 then checks its forwarding table and determines that the next node on the primary path to node 170, in this case, includes node 140.

Assume that the link between nodes 110 and 140 becomes unavailable (FIG. 5B) so that the transmission from node 110 to node 140 fails [steps 420 and 430]. Node 110 may determine that the transmission to node 140 fails via any conventional method, such as a failure to receive a timely acknowledgment from node 140.

As a result, node 110 finds one of its neighboring nodes that is also a neighbor of node 140 using, for example, the network topology data stored in its database 250 [step 440]. In this example, node 110 identifies node 130 as having a direct link to node 140 (FIG. 5C). Node 110 then transmits the packet on this alternate path to node 130 [step 450]. Node 130, in turn, forwards the packet to node 140 [step 460]. Node 140 receives the packet and determines whether it is the destination node [step 470]. In this example, node 140 is not the destination node, so it forwards the packet along the primary path to node 150 and processing continues as described above until the packet reaches the destination node 170.

A problem that often results when using alternate paths is that the packet becomes lost in the network or it enters into a loop. To solve this problem a simple header may be added to the packet. The node (e.g., node 110) that was unable to forward the packet on the primary path fills in the header with the address of the next node on the primary path (i.e., node 140). When the alternate node (i.e., node 130) receives the packet, it simply forwards the packet to the node address specified in the header. The receiving node (i.e., node 140) recognizes its own address in the header and clears it before further processing the packet. As a further measure to prevent lost packets or looping, the network 100 may prohibit a packet travelling on an alternate path from being forwarded on a second alternate path.

EXEMPLARY SYSTEM PROCESSING— SECOND IMPLEMENTATION

Figure 6:
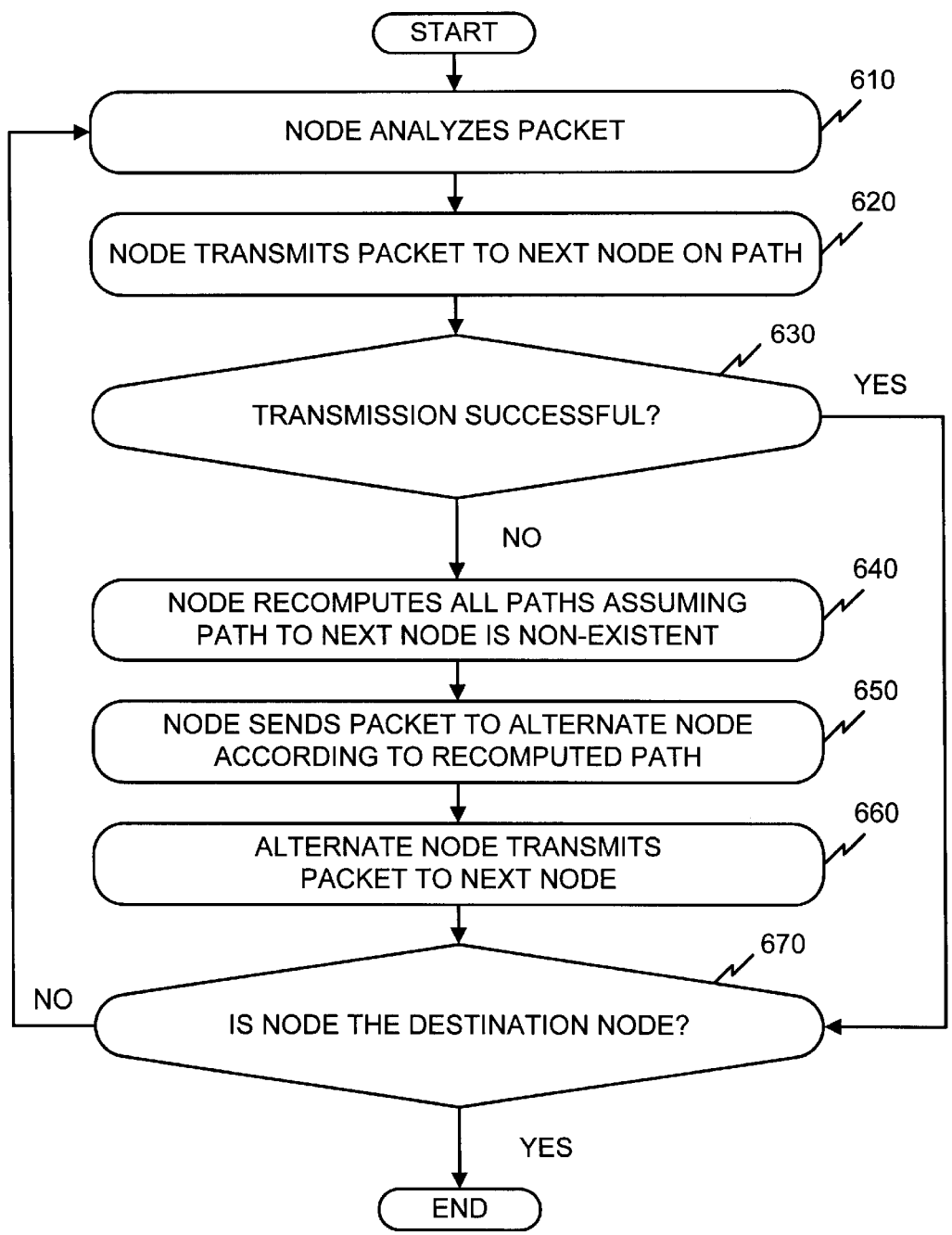
FIG. 6 is a flowchart of processing for routing a packet in accordance with a second implementation consistent with the present invention.
Figure 7A:
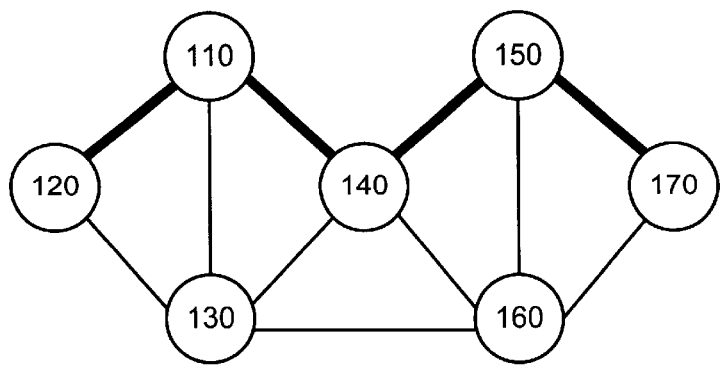
FIGS. 7A–7C are exemplary diagrams of packet routing according to the second implementation consistent with the present invention.
Figure 7B:
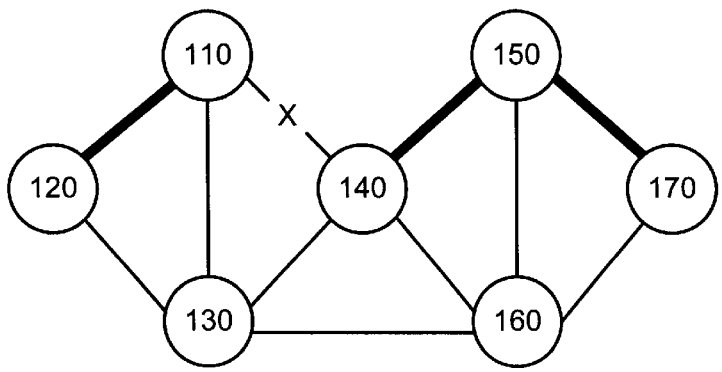
Figure 7C:
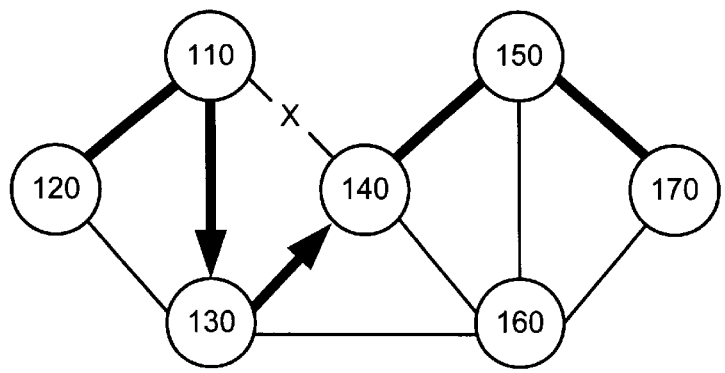

FIG. 6 is a flowchart of processing for routing a packet in accordance with a second implementation consistent with the present invention. FIGS. 7A–7C are exemplary diagrams of packet routing in accordance with the second implementation consistent with the present invention.

Processing begins when a source device or system transmits a packet to the network 100. A node, such as node 120, receives the packet. Node 120 analyzes the packet [step 610] and determines that it is destined for node 170, for example. Node 120 then checks its forwarding table and determines that the next node on the primary path to node 170 includes, for example, node 110 (FIG. 7A).

As a result, node 120 transmits the packet to node 110 as the next node on the path [step 620]. If the transmission was successful [step 630] and node 110 is not the destination node [step 670], then processing returns to step 610, where node 110 analyzes the received packet and determines that it is destined for node 170. Node 110 then checks its forwarding table.

Figure 8A:
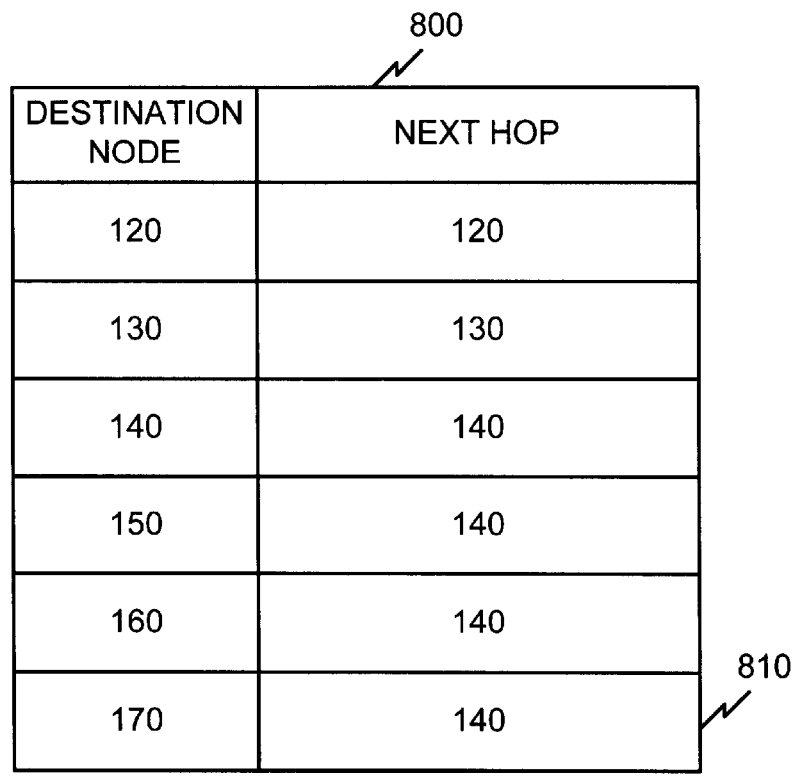
FIGS. 8A and 8B are exemplary diagrams of forwarding tables consistent with the present invention.
Figure 8B:
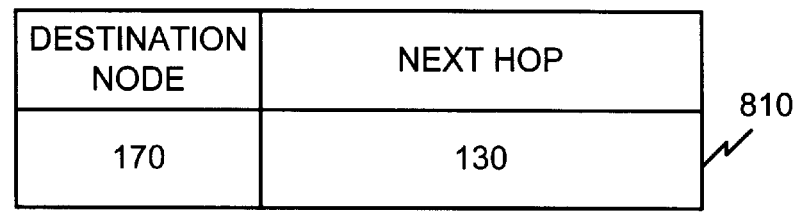

FIGS. 8A and 8B are exemplary diagrams of a forwarding table 800 of node 110. The forwarding table 800 includes entries corresponding to possible destination nodes in the network 100. When node 110 checks the forwarding table 800, it locates an entry 810 that has a destination node identifier equal to node 170 (FIG. 8A). In this case, node 110 finds that the next node on the primary path to node 170 includes node 140.

Assume that the link between nodes 110 and 140 becomes unavailable (FIG. 7B) so that the transmission from node 110 to node 140 fails [step 630]. Node 110 recomputes all of the paths with the knowledge that the link between nodes 110 and 140 is unavailable [step 640]. Node 110 may calculate the cost of each alternate path (e.g., cost in terms of propagation time, the amount of power required to transmit, network congestion, etc.) and select the path with the cheapest cost. Other methods for selecting an alternate path may also be used.

Assume, for example, that node 110 identifies the path through node 130 as the cheapest path to the next node (i.e., node 140) (FIG. 7C). As a result, node 110 may update the entry 810 in its forwarding table 800 to reflect the new path to node 140 (FIG. 8B). Node 110 may then transmit the packet to node 130 on the alternate path according to its updated forwarding table entry 810 [step 650]. Node 130, in turn, forwards the packet to node 140 [step 660]. In some instances, the path between the alternate node (i.e., node 130) and the next node (i.e., node 140) may not be via a direct link. In this case, the alternate node transmits the packet via one or more intermediate alternate nodes to the next node on the primary path.

Node 140 eventually receives the packet and determines whether it is the destination node [step 670]. In this example, node 140 is not the destination node, so it forwards the packet along the primary path to node 150 and processing continues as described above until the packet reaches destination node 170.

To address the problem of the packet becoming lost in the network or looping, a simple header may be added to the packet. The node (e.g., node 110) that was unable to forward the packet to the next node on the primary path fills in the header with the address(es) of the node(s) to which to send the packet, including the next node on the primary path (i.e., node 140). When the alternate node (i.e., node 130) receives the packet, it simply forwards the packet to the node address specified in the header using its forwarding table. The receiving node recognizes its own address in the header and clears it before further processing the packet. As a further measure to prevent lost packets or looping, the network 100 may prohibit a packet travelling on an alternate path from being forwarded on a second alternate path.

EXEMPLARY SYSTEM PROCESSING—THIRD IMPLEMENTATION

Figure 9:
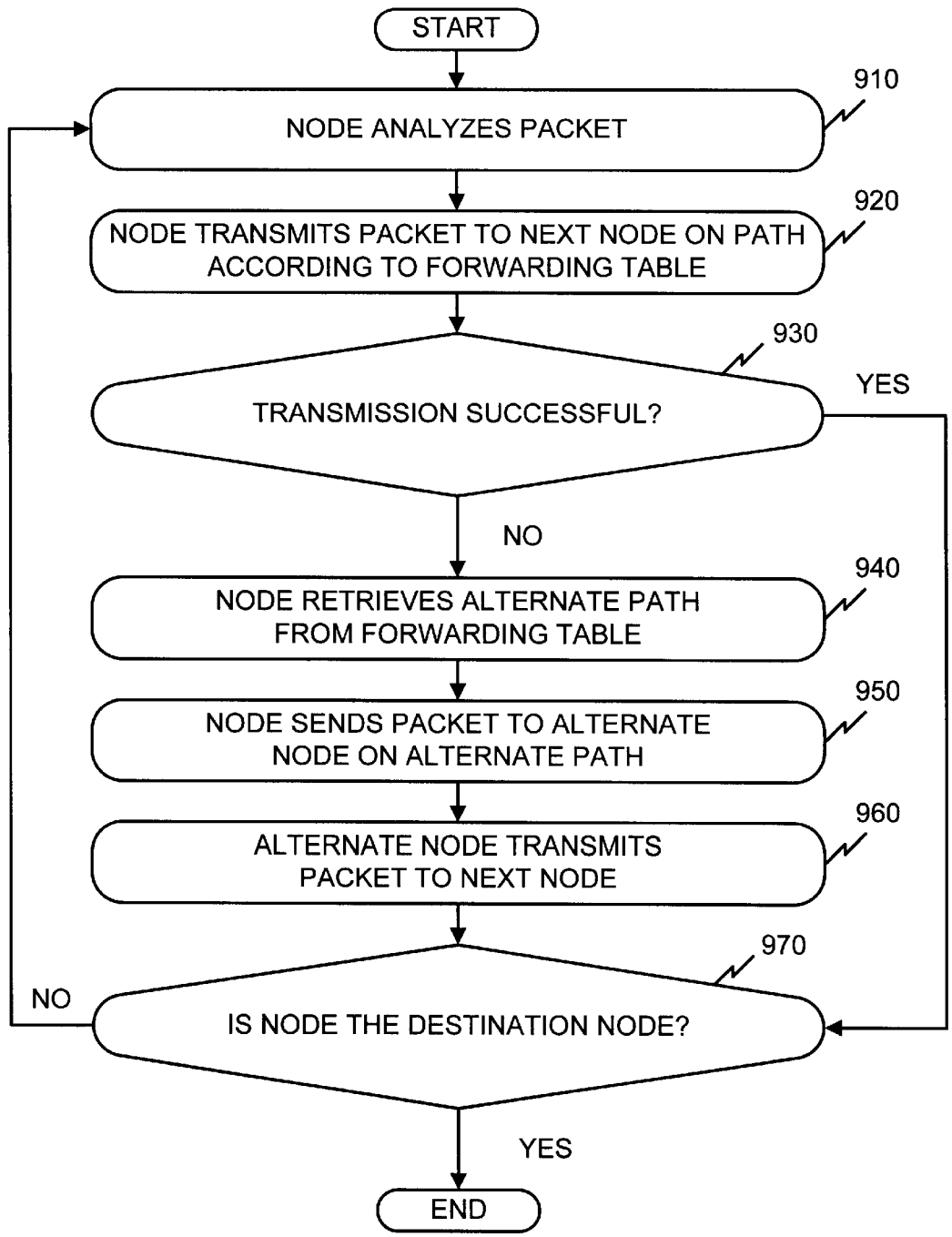
FIG. 9 is a flowchart of processing for routing a packet in accordance with a third implementation consistent with the present invention.
Figure 10A:
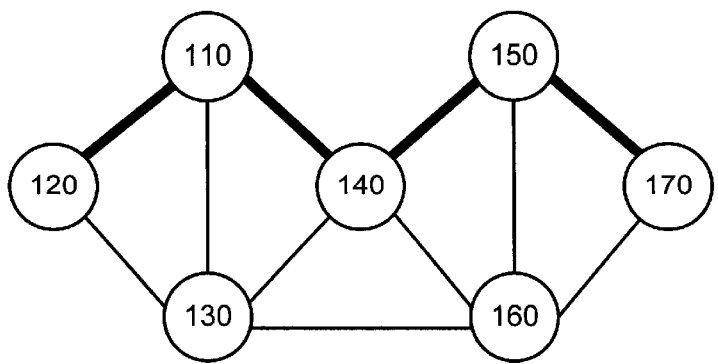
FIGS. 10A–10C are exemplary diagrams of packet routing according to the third implementation consistent with the present invention.
Figure 10B:
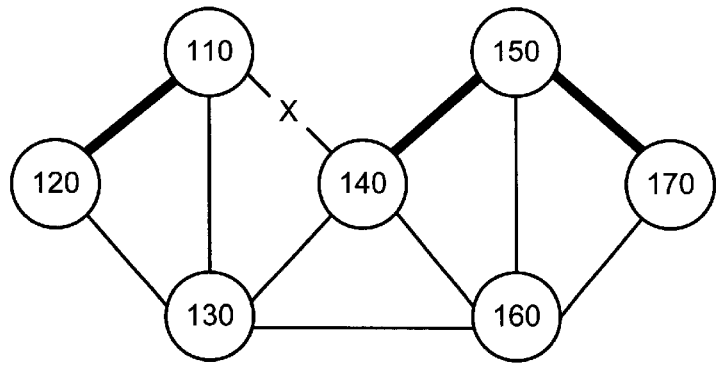
Figure 10C:
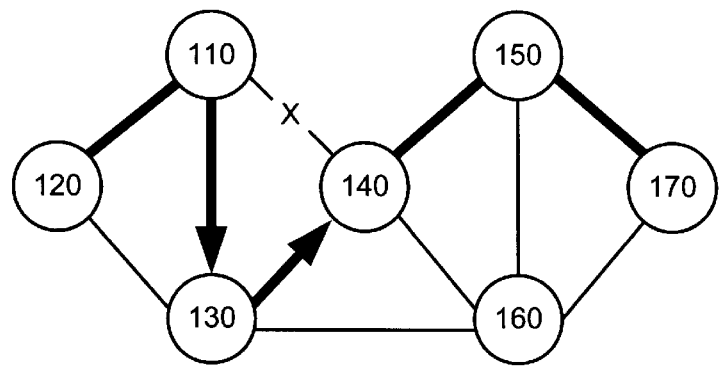

FIG. 9 is a flowchart of processing for routing a packet in accordance with a third implementation consistent with the present invention. FIGS. 10A–10C are exemplary diagrams of packet routing in accordance with the third implementation consistent with the present invention.

Processing begins when a source device or system transmits a packet to the network 100. A node, such as node 120, receives the packet. Node 120 analyzes the packet [step 910] and determines that it is destined for node 170, for example. Node 120 then checks its forwarding table and determines that the next node on the primary path to node 170 includes, for example, node 110 (FIG. 10A).

As a result, node 120 transmits the packet to node 110 as the next node on the path [step 920]. If the transmission was successful [step 930] and node 110 is not the destination node [step 970], then processing returns to step 910, where node 110 analyzes the received packet and determines that it is destined for node 170. Node 110 then checks its forwarding table.

Figure 11A:
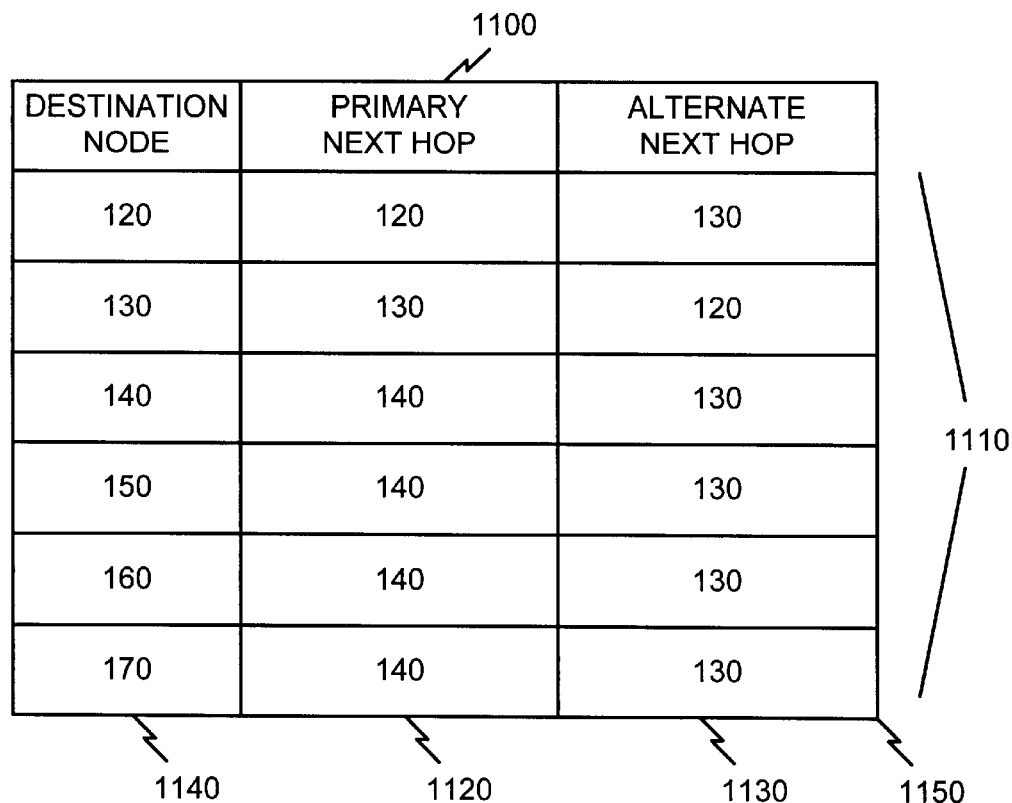
FIGS. 11A and 11B are exemplary diagrams of forwarding tables consistent with the present invention.
Figure 11B:
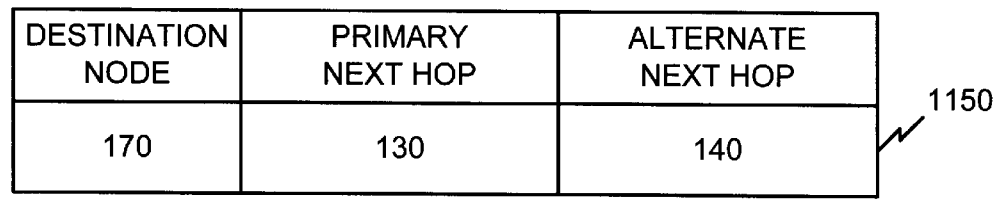

FIGS. 11A and 11B are exemplary diagrams of a forwarding table 1100 of node 110. The forwarding table 1100 includes entries 1110 corresponding to possible destination nodes in the network 100. Each of the entries identifies a primary next hop 1120 and an alternate next hop 1130 to the corresponding destination node 1140. When node 110 checks the forwarding table 1100, it locates an entry 1150 that has a destination node equal to node 170 (FIG. 11A). In this case, node 110 finds that the next node on the primary path to node 170 includes node 140.

Assume that the link between nodes 110 and 140 becomes unavailable (FIG. 10B) so that the transmission from node 110 to node 140 fails [step 930]. Node 110 retrieves the alternate next hop 1130 from the entry 1150 of the forwarding table 1100 [step 940]. In this case, the alternate next hop 1130 identifies node 130 as the alternate next hop to reach the next node (i.e., node 140) (FIG. 10C). As a result, node 110 may update the entry 1150 in its forwarding table 1100 to reflect that the alternate next hop 1130 is the new primary next hop and the former primary next hop 1120 is now the alternate next hop (FIG. 11B).

Node 110 may then transmit the packet to node 130 (i.e., the new primary next hop) according to its updated forwarding table entry 1150 [step 950]. Node 130, in turn, forwards the packet to node 140 [step 960]. In some instances, the path between the alternate node (i.e., node 130) and the next node (i.e., node 140) may not be via a direct link. In this case, the alternate node transmits the packet via one or more intermediate alternate nodes to the next node.

Node 140 eventually receives the packet and determines whether it is the destination node [step 970]. In this example, node 140 is not the destination node, so it forwards the packet along the primary path to node 150 and processing continues as described above.

To address the problem of the packet becoming lost in the network or looping, a simple header may be added to the packet. The node (e.g., node 110) that was unable to forward the packet on the primary path fills in the header with the address(es) of the node(s) to which to send the packet, including the next node on the primary path (i.e., node 140). When the alternate node (i.e., node 130) receives the packet, it simply forwards the packet to the node address specified in the header using its forwarding table. The receiving node recognizes its own address in the header and clears it before further processing the packet. As a further measure to prevent lost packets or looping, the network 100 may prohibit a packet travelling on an alternate path from being forwarded on a second alternate path.

CONCLUSION

Systems and methods consistent with the present invention provide improved packet transmission through a network. Nodes transmit a packet through the network on a primary path based on information stored in their forwarding tables. When a packet transmission fails, a transmitting node determines a next best path on which to transmit the packet to reach the next node on the primary path.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. A method for routing packets in a network having a plurality of nodes, comprising:

receiving a packet at a first one of the nodes;

analyzing the packet at the first node to identify a primary next hop to which to transmit the packet, the primary next hop identifying at least a second one of the nodes having a direct link to the first node;

transmitting the packet from the first node to the second node;

determining whether the transmission was successful;

identifying, by the first node, a third one of the nodes to which to transmit the packet when the transmission to the second node was unsuccessful, the third node having direct links to the first and second nodes;

sending the packet from the first node to the third node; and forwarding the packet from the third node to the second node.

2. The method of claim 1, wherein the analyzing includes:

retrieving the primary next hop from a forwarding table stored by the first node.

3. The method of claim 1, wherein the packet identifies a destination node; and wherein the analyzing includes:

identifying the second node to which to transmit the packet, the second node being different from the destination node.

4. The method of claim 1, wherein the identifying includes:

searching network topology data stored by the first node to locate the third node having direct links to the first and second nodes.

5. The method of claim 1, further comprising:

analyzing the packet at the second node to identify a fourth one of the nodes to which to transmit the packet.

6. The method of claim 1, wherein the sending includes:

adding a header to the packet, the header having an address of the second node.

7. The method of claim 6, wherein the forwarding includes:

receiving the packet at the third node, reading the header from the packet, and transmitting the packet to the address specified in the header.

8. The method of claim 6, further comprising:

receiving the packet at the second node; and clearing the header in the packet.

9. A system for routing packets in a network having a plurality of nodes, comprising:

means for receiving a packet at a first one of the nodes;

means for analyzing the packet at the first node to identify a primary next hop to which to transmit the packet, the primary next hop identifying at least a second one of the nodes having a direct link to the first node;

means for transmitting the packet from the first node to the second node;

means for determining whether the transmission was successful;

means for identifying, by the first node, a third one of the nodes to which to transmit the packet when the transmission to the second node was unsuccessful, the third node having direct links to the first and second nodes;

means for sending the packet from the first node to the third node; and means for forwarding the packet from the third node to the second node.

10. A network for routing packets, comprising:

a first node;

a second node, having a direct link to the first node, configured to receive a packet, identify a primary next hop to which to transmit the packet, the primary next hop identifying at least the first node, transmit the packet to the first node, and determine whether the transmission was successful; and a third node, having direct links to the first and second nodes, identified by the second node as an alternate next hop to which to transmit the packet when the transmission to the first node was unsuccessful, the third node being configured to receive the packet from the second node and forward the packet to the first node.

11. The network of claim 10, wherein the second node is further configured to retrieve the primary next hop from a forwarding table stored by the second node.

12. The network of claim 10, wherein the packet identifies a destination node; and wherein the second node is further configured to identify the first node to which to transmit the packet, the first node being different from the destination node.

13. The network of claim 10, wherein the second node is further configured to search network topology data stored by the second node to locate the third node having direct links to the first and second nodes.

14. The network of claim 10, wherein the first node is configured to analyze the packet to identify a fourth node to which to transmit the packet.

15. The network of claim 10, wherein the second node is further configured to add a header, having an address of the first node, to the packet, and send the packet to the third node.

16. The network of claim 15, wherein the third node is further configured to read the header from the packet and transmit the packet to the address specified in the header.

17. The network of claim 15, wherein the first node is configured to receive the packet and clear the header in the packet.

18. A node in a network having a plurality of nodes, comprising:

a memory configured to store a forwarding table that identifies primary next hops in paths from the node to corresponding destination nodes; and a processor configured to receive a packet, identify a primary next hop to which to transmit the packet from the forwarding table, the primary next hop identifying at least a first one of the nodes having a direct link to the node, transmit the packet to the first node, determine whether the transmission was successful, identify a second one of the nodes, having direct links to the first node and the node, to which to transmit the packet when the transmission to the first node was unsuccessful, and send the packet to the second node for forwarding to the first node.

19. A computer-readable medium containing instructions for controlling a node to perform a method for routing packets in a network having a plurality of nodes, the method comprising:

analyzing a received packet to identify a primary next hop to which to transmit the packet, the primary next hop identifying at least a first one of the nodes having a direct link to the node;

transmitting the packet to the first node;

determining whether the transmission was successful;

identifying a second one of the nodes to which to transmit the packet when the transmission to the first node was unsuccessful, the second node having direct links to the first node and the node; and sending the packet to the second node for forwarding to the first node.

20. A method for routing packets in a network having a plurality of nodes, comprising:

receiving a packet at a first one of the nodes;

analyzing the packet at the first node to identify a primary next hop to which to transmit the packet, the primary next hop identifying at least a second one of the nodes having a direct link to the first node;

transmitting the packet from the first node to the second node;

determining whether the transmission was successful;

identifying at least one alternate next hop, assuming that the direct link between the first and second nodes is unavailable, when the transmission to the second node was unsuccessful;

determining a cost associated with each of the alternate next hops;

selecting one of the alternate next hops based on the determined cost, the selected alternate next hop including at least a third one of the nodes;

sending the packet from the first node to the third node; and forwarding the packet from the third node to the second node.

21. The method of claim 20, wherein the analyzing includes:

retrieving the primary next hop from a forwarding table stored by the first node.

22. The method of claim 20, wherein the packet identifies a destination node; and wherein the analyzing includes:

identifying the second node to which to transmit the packet, the second node being different from the destination node.

23. The method of claim 20, further comprising:

analyzing the packet at the second node to identify a fourth one of the nodes to which to transmit the packet.

24. The method of claim 20, wherein the sending includes:

adding a header to the packet, the header having an address of at least the second node.

25. The method of claim 24, wherein the forwarding includes:

receiving the packet at the third node, reading the header from the packet, and transmitting the packet to the address specified in the header.

26. The method of claim 24, further comprising:

receiving the packet at the second node; and clearing the header in the packet.

27. A network for routing packets, comprising:

a first node;

a second node, having a direct link to the first node, configured to receive a packet, identify a primary next hop to which to transmit the packet, the primary next hop identifying at least the first node, transmit the packet to the first node, determine whether the transmission was successful, identify at least one alternate next hop, assuming that the direct link between the first and second nodes is unavailable, when the transmission to the first node was unsuccessful, determine a cost of each of the alternate next hops, select one of the alternate next hops based on the determined cost, and send the packet to the selected alternate next hop; and a third node, corresponding to the selected alternate next hop, configured to receive the packet from the second node and forward the packet to the first node.

28. The network of claim 27, wherein the second node is further configured to retrieve the primary next hop from a forwarding table stored by the second node.

29. The network of claim 27, wherein the packet identifies a destination node; and wherein the second node is further configured to identify the first node to which to transmit the packet, the first node being different from the destination node.

30. The network of claim 27, wherein the first node is further configured to analyze the packet to identify a fourth node to which to transmit the packet.

31. The network of claim 27, wherein the second node is further configured to add a header to the packet, the header having an address of at least the first node.

32. The network of claim 31, wherein the third node is further configured to read the header from the packet and transmit the packet to the address specified in the header.

33. The method of claim 31, wherein the first node is configured to receive the packet and clear the header in the packet.

34. A node in a network having a plurality of nodes, comprising:

a memory configured to store a forwarding table that identifies primary next hops on paths from the node to corresponding destination nodes; and a processor configured to receive a packet, identify a primary next hop to which to transmit the packet, the primary next hop identifying at least a first one of the nodes, transmit the packet to the first node, determine whether the transmission was successful, identify at least one alternate next hop, assuming that a link between the node and the first node is unavailable, when the transmission to the first node was unsuccessful, determine a cost associated with each of the alternate next hops, select one of the alternate next hops based on the determined cost, the selected alternate next hop including at least a second one of the nodes, and send the packet to the second node for forwarding to the first node.

35. A computer-readable medium containing instructions for controlling a node to perform a method for routing packets in a network having a plurality of nodes, the method comprising:

analyzing a received packet to identify a primary next hop to which to transmit the packet, the primary next hop identifying at least a first one of the nodes having a direct link to the node;

transmitting the packet to the first node;

determining whether the transmission was successful;

identifying at least one alternate next hop, assuming that the direct link between the node and the first node is unavailable, when the transmission to the first node was unsuccessful;

determining a cost associated with each of the alternate next hops;

selecting one of the alternate next hops based on the determined cost, the selected alternate next hop including at least a second one of the nodes; and sending the packet to the second node for forwarding to the first node.

36. A method for preventing lost or looping packets in a network, comprising:
- receiving a packet at a first node;
- transmitting the packet to a second node on a primary path;
- determining whether the transmission was successful;
- identifying a third node on an alternate path when the transmission to the second node was unsuccessful;
- adding a header to the packet, the header identifying at least an address of the second node;
- transmitting the packet to the third node;
- analyzing the packet by the third node to identify the address of the second node from the header;
- sending the packet to the second node using the identified address;
- receiving the packet at the second node; and
- clearing the header by the second node.

37. The method of claim 36, wherein the identifying includes:
- finding the third node in the network having direct links to the first and second nodes.

38. The method of claim 36, wherein the identifying includes:
- identifying at least one alternate path assuming that a link between the first and second nodes is unavailable,
- determining a cost of each of the alternate paths, and
- selecting one of the alternate paths based on the determined cost, the selected alternate path including the third node.

39. The method of claim 36, wherein the identifying includes:
- retrieving a predetermined alternate path from a forwarding table stored by the first node, the predetermined alternate path including the third node.

40. A method for routing packets in a network having a plurality of nodes, comprising:
- receiving a packet at a first one of the nodes;
- analyzing the packet at the first node to identify a destination node;
- retrieving, from a forwarding table, a primary next hop to which to transmit the packet based on the destination node, the primary next hop identifying at least a second one of the nodes having a direct link to the first node;
- transmitting the packet from the first node to the second node;
- determining whether the transmission was successful;
- retrieving, from the forwarding table, an alternate next hop when the transmission to the second node was unsuccessful, the alternate next hop including at least a third one of the nodes;
- swapping the primary and alternate next hops in the forwarding table;
- sending the packet from the first node to the third node; and
- forwarding the packet from the third node to the second node.

41. The method of claim 40, further comprising:
- analyzing the packet at the second node to identify a fourth one of the nodes to which to transmit the packet.

42. The method of claim 40, wherein the sending includes:
- adding a header to the packet, the header having an address of at least the second node.

43. The method of claim 42, wherein the forwarding includes:
- receiving the packet at the third node,
- reading the header from the packet, and
- transmitting the packet to the address specified in the header.

44. The method of claim 42, further comprising:
- receiving the packet at the second node; and
- clearing the header in the packet.

45. A network for routing packets, comprising:
- a first node;
- a second node, having a direct link to the first node, configured to receive a packet, retrieve a primary next hop to which to transmit the packet from a forwarding table, the primary next hop identifying at least the first node, transmit the packet to the first node, determine whether the transmission was successful, retrieve an alternate next hop from the forwarding table when the transmission to the first node was unsuccessful, send the packet to the alternate next hop, and swap the primary and alternate next hops in the forwarding table; and
- a third node, corresponding to the alternate next hop, configured to receive the packet from the second node and forward the packet to the first node.

46. The network of claim 45, wherein the second node is further configured to add a header to the packet, the header having an address of at least the first node.

47. The network of claim 46, wherein the third node is further configured to read the header from the packet and transmit the packet to the address specified in the header.

48. The method of claim 46, wherein the first node is configured to receive the packet and clear the header in the packet.

49. A node in a network having a plurality of nodes, comprising:
- a memory configured to store a forwarding table that identifies primary next hops and alternate next hops on paths from the node to corresponding destination nodes; and
- a processor configured to receive a packet, retrieve a primary next hop to which to transmit the packet from the forwarding table, the primary next hop identifying at least a first one of the nodes, transmit the packet to the first node, determine whether the transmission was successful, retrieve an alternate next hop from the forwarding table when the transmission to the first node was unsuccessful, the alternate next hop including at least a second one of the nodes, send the packet to the second node for forwarding to the first node, and swap the primary and alternate next hops in the forwarding table.

50. A computer-readable medium containing instructions for controlling a node to perform a method for routing packets in a network having a plurality of nodes, the method comprising:
- analyzing a received packet to identify a destination node;
- retrieving, from a forwarding table, a primary next hop to which to transmit the packet based on the destination node, the primary next hop identifying at least a first one of the nodes having a direct link to the node;
- transmitting the packet to the first node;
- determining whether the transmission was successful;
- retrieving, from the forwarding table, an alternate next hop when the transmission to the first node was unsuccessful, the alternate next hop including at least a second one of the nodes;

sending the packet to the second node for forwarding to the first node; and swapping the primary and alternate next hops in the forwarding table for use in subsequent packet routing.

51. A network for routing packets, comprising:

a first node; and a second node, having a direct link to the first node, configured to receive a packet, identify a primary next hop to which to transmit the packet, the primary next hop identifying at least the first node, transmit the packet to the first node, determine whether the transmission was successful, and identify at least a third node when the transmission to the first node was unsuccessful by performing at least one of identifying a node in the network that has a direct link to both the first and second nodes, the identified node including the third node, identifying at least one alternate next hop, assuming that the link between the first and second nodes is unavailable, determining a cost associated with each of the alternate next hops, and selecting one of the alternate next hops based on the determined cost, the selected alternate next hop including at least the third node, and retrieving a predetermined alternate next hop from a forwarding table stored by the second node, the predetermined alternate next hop including at least the third node, the second node transmitting the packet to the third node for forwarding to the first node.

\* \* \* \* \*